J. L. TAYLOR
BARGE
Feb. 17, 1931.
Re. 17,968
Original Filed Nov. 16, 1928
3 Sheets-Sheet 1
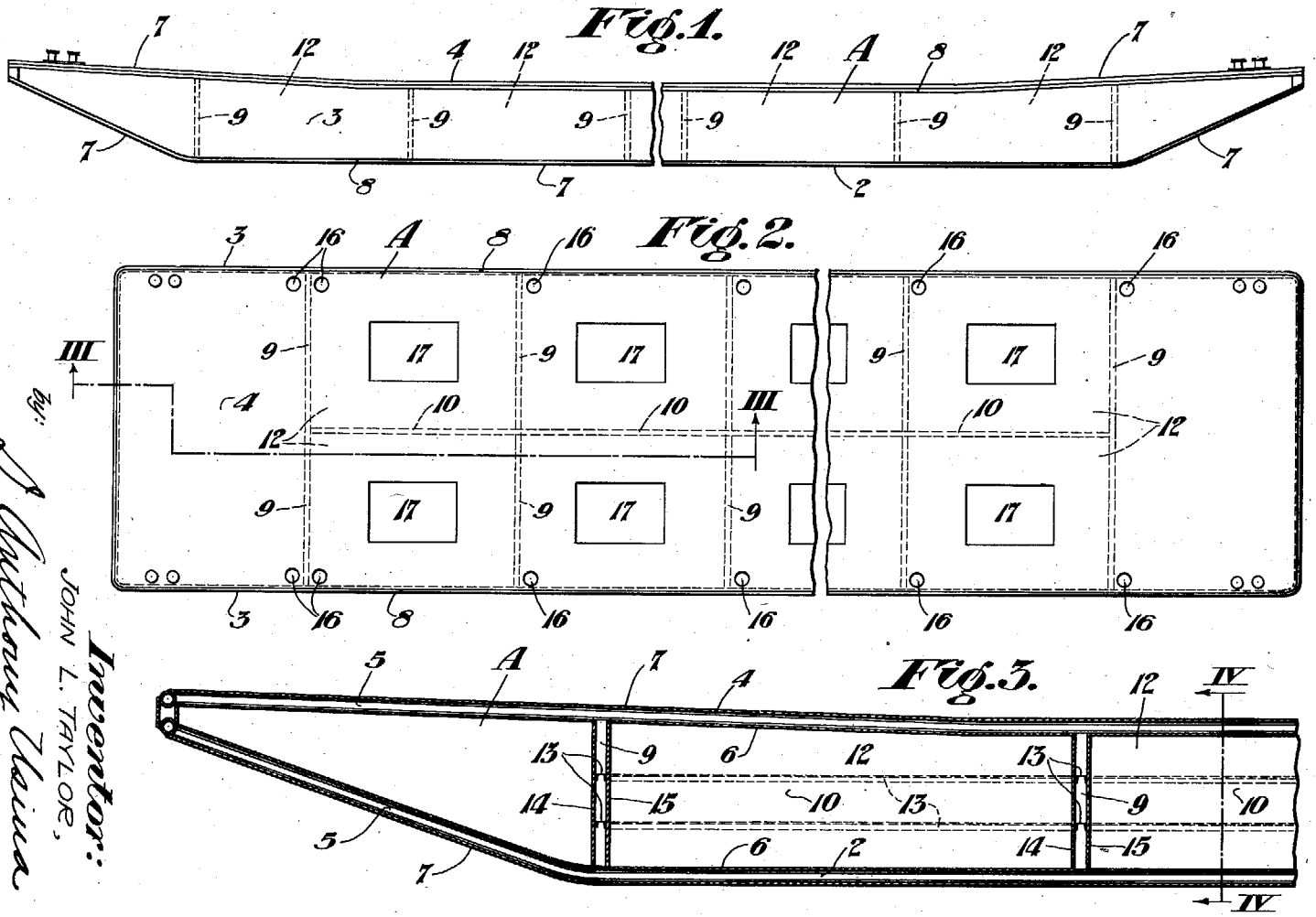
Inventor:
JOHN L. TAYLOR,
by: D. Anthony Usina
his Attorney.

J. L. TAYLOR
Feb. 17, 1931. BARGE Re. 17,968
Original Filed Nov. 13, 1928 3 Sheets-Sheet 2
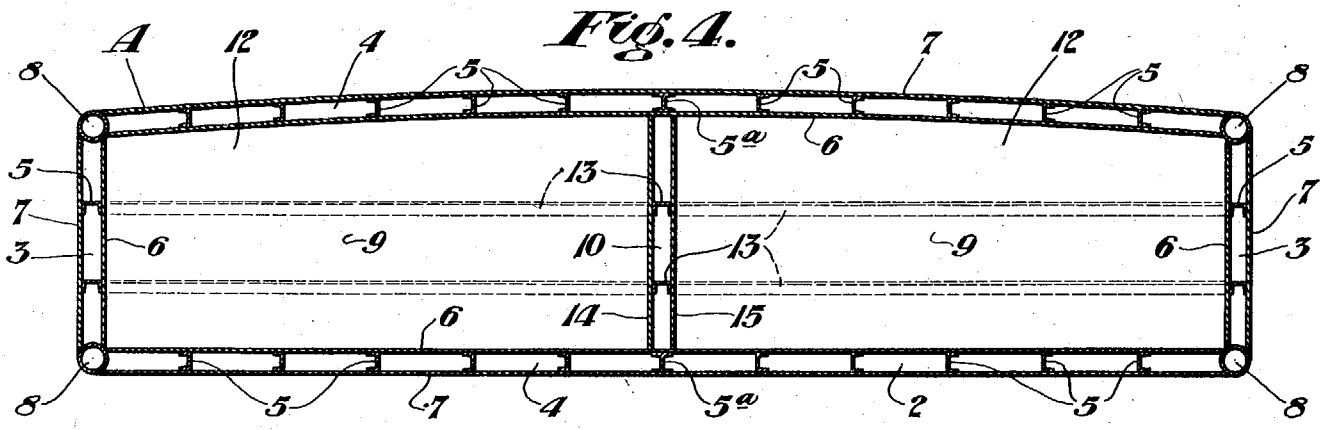
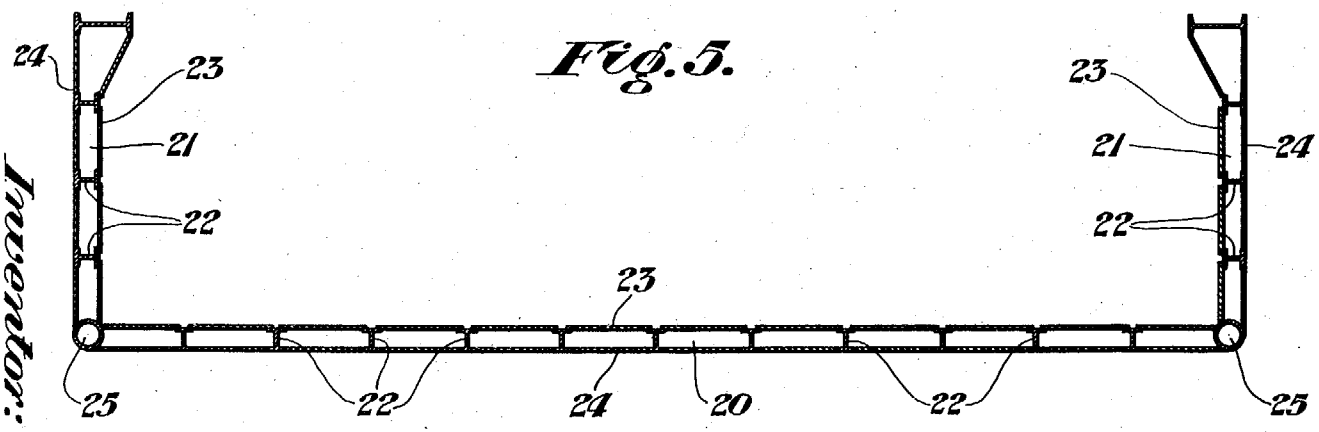
Inventor:
JOHN L. TAYLOR,
By: J. Anthony Usina
his Attorney.

J. L. TAYLOR
BARGE
Feb. 17, 1931.
Re. 17,968
Original Filed Nov. 16, 1928
3 Sheets-Sheet 3
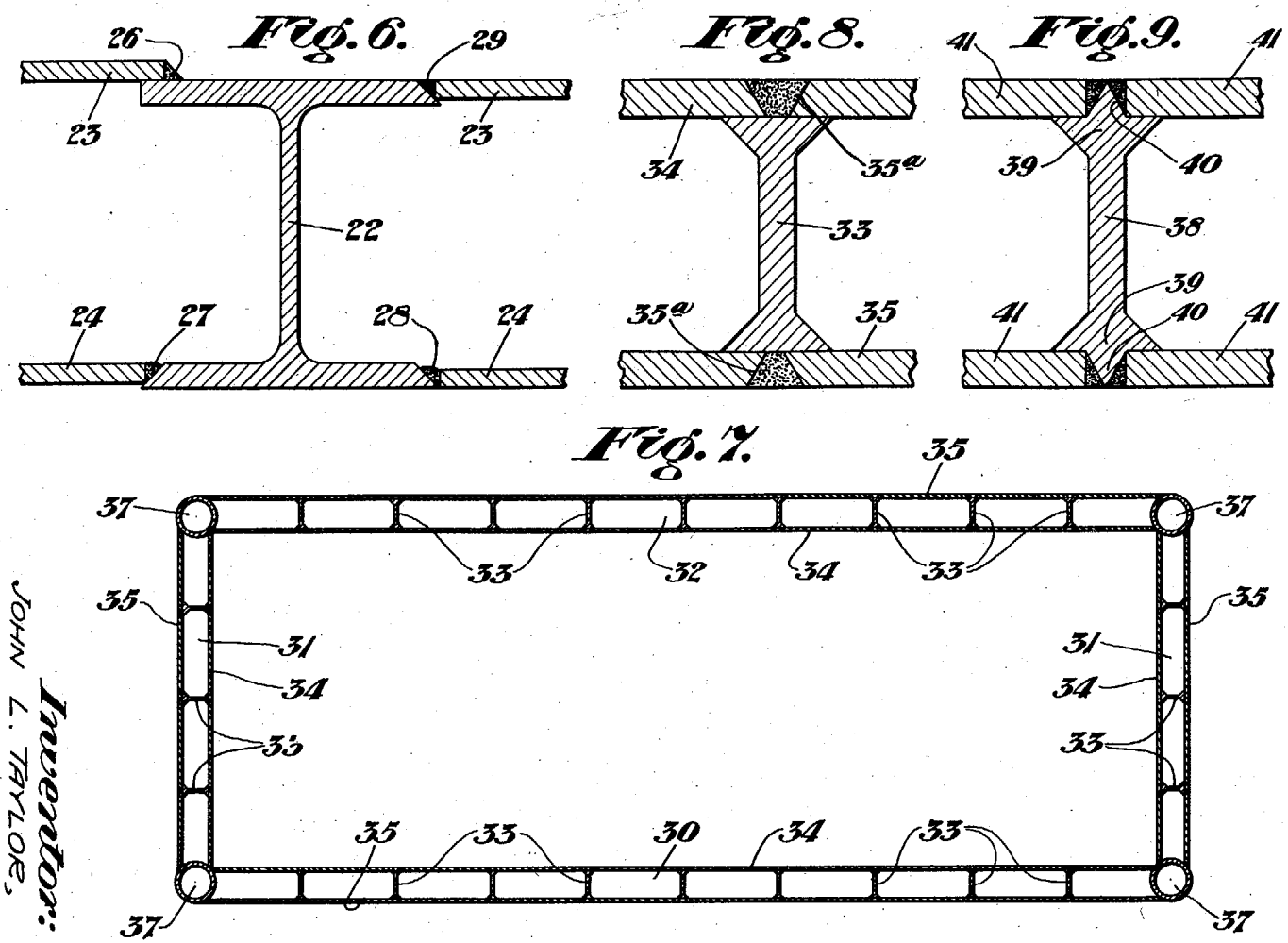
Inventor:
JOHN L. TAYLOR,
by: D. Anthony Weiss
his Attorney Reissued Feb. 17, 1931

Re. 17,968

UNITED STATES PATENT OFFICE

JOHN L. TAYLOR, OF WEST VIEW BOROUGH, PENNSYLVANIA

BARGE

Original No. 1,764,585, dated June 17, 1930, Serial No. 319,892, filed November 16, 1928. Application for reissue filed December 12, 1930. Serial No. 501,997.

This invention relates to barges and more particularly to the shell construction for barges, boats and similar craft, and has for its object the provision of a shell construction which will be self-sustaining without the usual framing.

Another object is to provide an all-steel barge shell which will be of relatively lighter weight, greater load carrying capacity, and more buoyant than steel barges as heretofore constructed.

In the drawings:

Figure 1 is a side elevation of a barge constructed in accordance with this invention.

Figure 2 is a plan view thereof.

Figure 3 is a partial longitudinal sectional view.

Figure 4 is a transverse sectional view.

Figure 5 is a transverse sectional view of a modified form of barge shell.

Figure 6 is a fragmentary enlarged detail showing the ways the skins are welded to the ribs of the shell of Figure 5.

Figure 7 is a transverse sectional view of a still further modified form of barge shell.

Figure 8 is a fragmentary enlarged detail showing the construction of the I-shaped ribs of Figure 7 and the manner in which the skins are welded thereto.

Figure 9 is a fragmentary sectional view showing a modified form of I-shaped rib.

Referring more particularly to the drawings, the letter A designates the barge shell as a whole which is composed of a bottom unit 2, side units 3 and a deck unit 4. Each unit is composed of a plurality of ribs 5 composed of rolled metal channel shapes, arranged in parallel spaced relation and having inner and outer skins 6 and 7, respectively, composed of metal plates secured to the opposite flanges of the ribs by lines of tack-welding. The plates are also welded to each other.

The bottom unit 2 has its ends inclined upwardly to form the rake ends of the barge.

The units 2, 3 and 4, when assembled, are adapted to be joined at their longitudinal edges by tubular ribs 8 to which the longitudinal edges of skins 6 and 7 of the units are joined by line welds.

Suitable transverse and longitudinal watertight bulkheads 9 and 10, respectively, are built into the shell A to provide cargo carrying holds 12. The bulkheads 9 and 10 are of double wall construction and are composed of rolled steel channel shapes 13 and walls 14 and 15 composed of steel plates welded to the shapes 13.

If desired or necessary, the center rib $5^a$ of the bottom unit 2 and deck unit 4 may be composed of two channel shapes arranged back-to-back, or a standard H-beam section may be used so as to provide additional strength and support for the central bulkhead partition.

Suitable manholes 16 and hatches 17 are provided to permit access to the holds.

In Figures 5 and 6 I have shown an open barge construction in which the shell is composed of a bottom unit 20 and side units 21. Each unit is composed of a plurality of ribs 22 formed from rolled metal H-beams, which ribs are arranged in parallel spaced relation and support inner and outer skins 23 and 24, respectively. The skins 23 and 24 are composed of a plurality of metal plates welded to the flanges of the ribs 22 by line welds.

The bottom and side units 20 and 21 are assembled and connected at their longitudinal edges by tubular ribs 25 to which the longitudinal edges of the skins 23 and 24 are welded by line welds.

In the enlarged detail of Figure 6 the numeral 26 designates a lap joint made between the plates of the inner skin when it is not necessary to have an absolutely smooth surface. The numerals 27 and 28 designate butt joints made in forming the outer skin 24. In each of the joints 27 and 28 the edge of the flange of the rib is beveled to provide a pocket for the welding metal used in making the line weld. The plate of the joint 28 is materially thinner than the plate of joint 27. The numeral 29 designates a joint used to connect the plates of the inner skin when a smooth surface is necessary or desirable.

In Figures 7 and 8 I have shown a decked barge construction in which the shell is composed of bottom, side and deck units 30, 31 and 32, respectively. Each unit of this modified construction is composed of a plurality of ribs 33 of special rolled metal I-beam shapes arranged in parallel spaced relation and having inner and outer skins 34 and 35, respectively, composed of metal plates secured to the opposite flanges or heads of the ribs by line-welding. The plates have their edges scarfed to provide a V-shaped groove 35[a] between the abutting edges of the plates over the heads of the ribs to receive the welding metal used in securing the plate together.

The units 30, 31 and 32, when assembled, are adapted to be joined at their longitudinal edges by tubular ribs 37 to which the longitudinal edges of the skins 34 and 35 are joined by line-welding.

In Figure 9 I have shown a special form of rolled I-beam adapted for use as a rib in the novel barge shell constructions of this invention. The I-beam of this figure comprises a web portion 38 and integral head portions 39. The head portions 39 are provided with inverted V-shaped ribs 40 along their centers, adapted to cooperate with the plates 41 forming the skins of the barge shell to form grooves to receive the welding metal used to attach the plates to the ribs.

If desired, the ribs 40 may be omitted from one of the head portions 39 of the rib and the plates may be attached by welding directly to the flat face of the head.

It will be understood, of course, that while I have shown the deck, side and bottom walls or units of the barges as all being of double skin construction I do not wish to be limited to this construction since the inner skin may be omitted from either the deck or side units without materially reducing the buoyancy of the structures and such a construction may be desirable in some instances.

Barge shells constructed in accordance with this invention will be considerably lighter than barge shells as heretofore constructed due to the absence of framing, and also will have a materially greater load carrying capacity, due to the absence of the framing and the fact that the double skinned water-tight shell units add buoyancy to the structure.

While I have shown and described various specific embodiments of my invention, it will be understood that I do not wish to be limited thereto, since various modifications may be made without departing from the scope thereof, as defined in the appended claims.

I claim:

1. A barge shell composed of bottom and side units, said bottom unit having its end portions inclined upwardly to form rake ends, each of said units comprising inner and outer skins held in spaced relation by a single series of ribs composed of rolled metal shapes arranged in parallel lines and spaced from each other, said skins being formed from metal plates and said plates being welded to said ribs and to each other to form substantially continuous, smooth, water-tight inner and outer skins, and tubular connecting ribs extending along the junction line of said bottom and side units and the skins of said units being welded to said tubular ribs.

2. A barge shell composed of bottom and side units, said bottom unit having its end portions inclined upwardly to form rake ends, each of said units comprising inner and outer skins held in spaced relation by a single series of ribs composed of rolled metal H-beams arranged in parallel lines and spaced from each other, said skins being formed from metal plates and said plates having line welds connecting said plates with the flanges of said H-beams, and line welds connecting said plates with each other, and tubular connecting ribs extending along the junction line of said bottom and side units and the skins of said units being welded to said tubular ribs.

3. A frameless barge shell composed of bottom and side units, said bottom unit having its end portions inclined upwardly to form rake ends, each of said units comprising inner and outer skins held in spaced relation by a single series of ribs composed of rolled metal shapes arranged in parallel lines and spaced from each other, said skins being formed from metal plates and said plates being welded to said ribs and to each other whereby each unit is self-buoyant due to its air and water-tight spaced double wall construction.

4. A barge shell composed of bottom and side units, each of said units comprising a single series of ribs composed of rolled metal shapes arranged in parallel lines and spaced from each other, an outer skin mounted on said ribs and composed of a series of metal plates welded to said ribs and to each other to form a substantially continuous, smooth, water-tight skin, said bottom unit also being provided with an inner skin mounted on the faces of the ribs of said unit opposite said outer skin, said inner skin being also composed of a series of metal plates welded to said ribs and to each other to form a substantially continuous, smooth, water-tight skin, and hollow connecting ribs extending along the junction line of said bottom and side units and the skins of said units being welded to said hollow ribs.

5. A barge shell composed of bottom and side units, each of said units comprising a single series of ribs composed of rolled metal flanged shapes arranged in parallel lines and spaced from each other, an outer skin mounted on said ribs and composed of a series of metal plates welded to the outer flanges of said ribs to form a substantially continuous, smooth, water-tight skin, said bottom unit also being provided with an inner skin mounted on the flanges of the ribs of said unit opposite the outer skin, said inner skin being also composed of a series of metal plates welded to the flanges of said ribs to form a substantially continuous, smooth, water-tight skin, and hollow connecting ribs extending along the junction line of said bottom and side units and the skins of said units being welded to said hollow ribs.

6. A barge shell composed of bottom and side units, each of said units comprising a single series of ribs composed of rolled metal flanged shapes arranged in parallel lines and spaced from each other, an outer skin mounted on said ribs and composed of a series of metal plates secured to the outer flanges of said ribs and to each other to form a substantially continuous, smooth, water-tight skin, said bottom unit also being provided with an inner skin mounted on the flanges of the ribs of said unit opposite the outer skin, said inner skin being also composed of a series of metal plates secured to the inner flanges of said ribs and to each other to form a substantially continuous, smooth, water-tight skin, and connecting ribs in the form of bilge knuckles extending along the junction line of said bottom and side units and the skins of said units being secured to said knuckles.

In testimony whereof, I have hereunto set my hand.

JOHN L. TAYLOR.